United States Patent [19]

Young

[11] Patent Number: 4,548,283

[45] Date of Patent: Oct. 22, 1985

[54] ROTATING SHAFT SEAL AND BEARING LUBRICATING APPARATUS

[76] Inventor: David E. Young, 303 South Shadowbend, Friendswood, Tex. 77546

[21] Appl. No.: 224,445

[22] Filed: Jan. 12, 1981

[51] Int. Cl.$^4$ .............................................. E21B 4/02
[52] U.S. Cl. ..................................... 175/107; 175/228
[58] Field of Search ................. 175/107, 228; 277/3, 277/13, 14 R, 14 V

[56] References Cited

U.S. PATENT DOCUMENTS

| | | | |
|---|---|---|---|
| 3,659,662 | 5/1972 | Dicky | 175/107 |
| 4,080,115 | 3/1978 | Sims | 175/107 |
| 4,260,031 | 4/1981 | Jackson | 175/107 |
| 4,260,032 | 4/1981 | Fox | 175/107 X |
| 4,260,167 | 4/1981 | Fox | 175/107 X |
| 4,324,299 | 4/1982 | Nagel | 175/107 |

*Primary Examiner*—James A. Leppink
*Assistant Examiner*—Thuy M. Bui
*Attorney, Agent, or Firm*—Carl O. McClenny; William E. Johnson, Jr.

[57] ABSTRACT

In accordance with an illustrative embodiment of the present invention, a seal or bearing lubricating system adapted for use in a downhole tool such as a drilling motor includes chamber means packed with grease for lubricating said seal and/or bearing, and centrifugal separator means responsive to rotation of a shaft included in said tool for separating and trapping solid particles suspended in the well fluids to prevent contamination of the grease by such solid particles. Pressure equalization across a principal rotating shaft seal also is disclosed.

20 Claims, 6 Drawing Figures

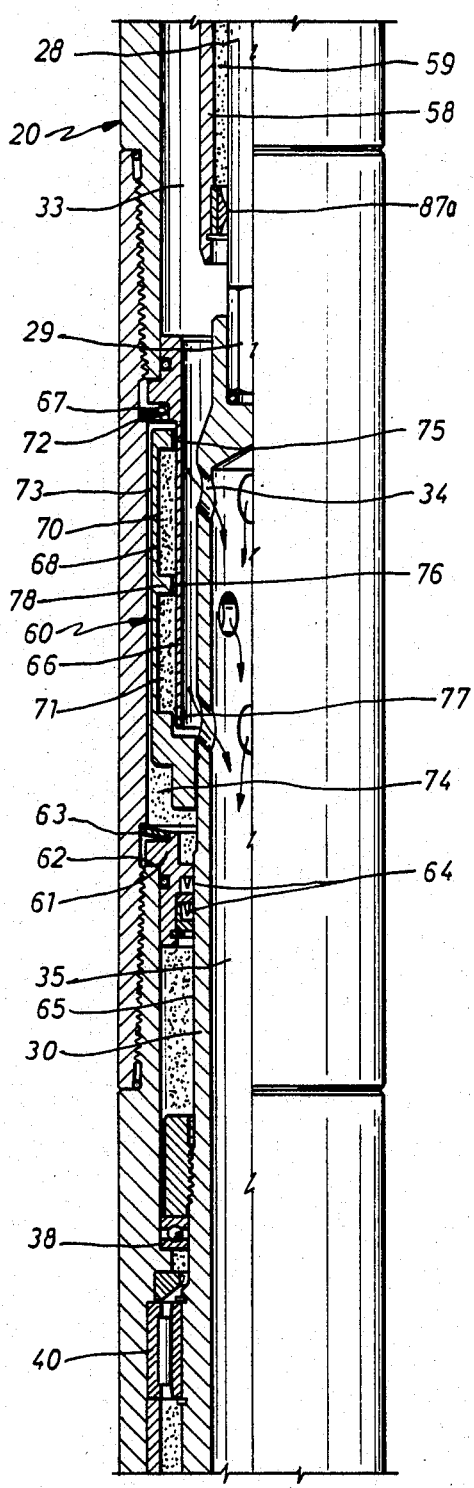
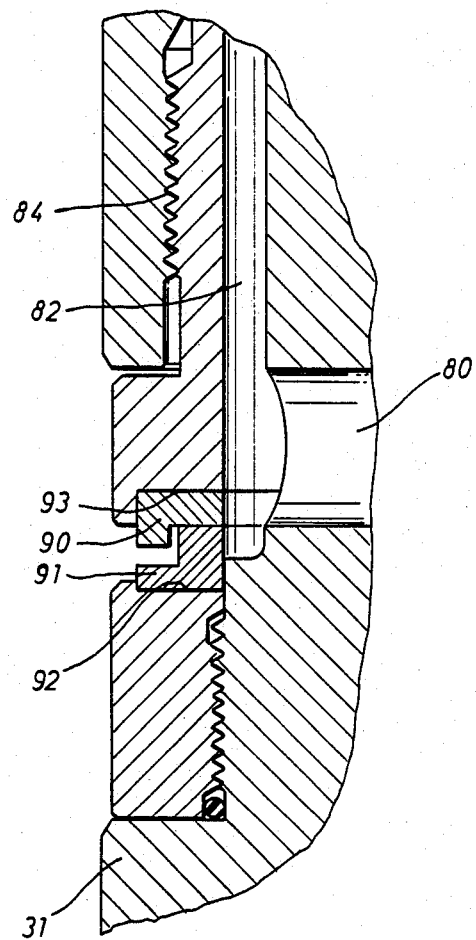
Fig. 2C
Fig. 3

ROTATING SHAFT SEAL AND BEARING LUBRICATING APPARATUS

FIELD OF THE INVENTION

This invention relates generally to rotating shaft seal and bearing systems, and particularly to a new and improved rotary shaft seal or bearing apparatus that is adapted for very rugged service conditions such as might be encountered, for example, when used in conjunction with a downhole drilling motor.

BACKGROUND OF THE INVENTION

Downhole drilling motors are used to power the drill bit during certain well drilling operations, such as where the direction of a well bore needs to be changed rather abruptly and with precision in order to reach a desired earth formation target. Such motors generally are powered by the circulation of well drilling fluid, commonly called drilling "mud", that is pumped from the surface down through the drill pipe where the fluid exits through the nozzles or jets in the drill bit and then returns to the surface through the annular space between the borehole wall and the drill pipe. Of course the fluid lubricates and cools the bit and carries rock cuttings up and out of the well. Drilling motors have taken various forms such as turbines, rotating vane devices and Moineau motors. However, all the designs that applicant is familiar with have not had a very long useful life due to the extremely rugged service conditions that are encountered. A principle factor in early breakdown is due to the fact that the drilling fluids even after filtering at the surface contain small abrasive rock particles that cause rapid wear of various motor parts, particularly the rotating shaft seals and bearings that typically are present in a motor assembly. The problem will be readily appreciated when it is realized that in all fluid driven motors of the types described above, the pressure drop across the bit nozzles causes the drilling mud with entrained rock particles passing through the motor to enter the seals and bearings, which leads to abrasion and wear of seal surfaces and damage to the elements themselves. Of course, the motor substantially inoperative for continued well drilling operations due to rapid leakage of fluids to the annulus with consequently reduced horsepower output, and even shaft seizure, so that the motor can no longer function to drive the drill bit efficiently (or perhaps even at all). When failure occurs, the drilling operation must be terminated and the drill pipe and the motor withdrawn from the well so that the motor can be replaced or repaired, which is a time consuming and thus costly procedure.

The maintenance of operative rotating shaft seals and bearings has continued to be a vexing problem that has limited the use of downhole drilling motors as effective well drilling tools. It is to a unique solution to this problem that the present invention is directed.

The general object of the present invention is to provide a new and improved rotating shaft seal or bearing apparatus that is designed for the very rugged service conditions such as may be encountered, for example, in well drilling operations using a downhole motor.

SUMMARY OF THE INVENTION

This and other objects are attained in accordance with the concepts of the present invention through the provision of apparatus comprising first and second members that are rotatable relative to one another, and structural means such as a seal or a bearing located between said members and adapted to operate in a lubricated environment. A sleeve member fixed to one of said members is constructed and arranged to provide one or more annular chambers that initially are packed with a lubricant such as a suitable grease that is pressurized by the drilling fluids. The grease and the drilling mud are inhibited from mixing by fluid density difference. One of the chambers provides a centrifugal separator which forces to the outside the solid particles suspended in the mud, and an inwardly directed shoulder at the upper end of the chamber traps the particles and prevents movement thereof toward the seals and bearings. Thus, these elements are isolated from the abrasive particles suspended in the drilling fluids to promote seal and bearing longivity and prevent breakdown of a drilling motor due to failure thereof.

BRIEF DESCRIPTION OF THE DRAWINGS

The present invention has other features and advantages which will become more readily apparent in connection with the followed detailed description of a preferred embodiment taken in conjunction with the appended drawings in which:

FIGS. 2A-2D are longitudinal sectional views, with portions in side elevation, of a downhole drilling motor that incorporates seal and bearing lubricating systems that are constructed in accordance with the present invention.

FIG. 3 is a sectional view of an embodiment providing intentional leaking to the annulus.

DESCRIPTION OF PREFERRED EMBODIMENTS

Figure 1:
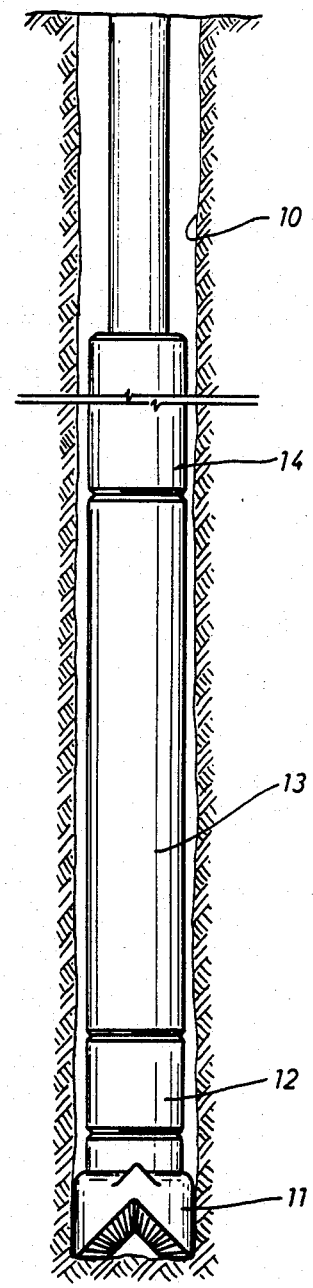
FIG. 1 is a schematic view of a well drilling operation utilizing a downhole drilling motor.

Referring initially to FIG. 1, a well bore 10 is shown being drilled by a bit 11 that is attached to the output shaft 12 of a drilling motor indicated generally at 13. The upper end of the motor is attached to the lower end of the drilling string 14 which may include heavy drill collars to provide a desired weight on a bit, a bent sub to control the direction of the drilling of the borehole, and drill pipe extending upwardly to the surface. During typical operations, drilling mud is pumped down through the drill string 14 where it passes through the motor 13 and powers the same, and then exits via nozzles of the bit 11 for return to the surface carrying cuttings. At the surface, the drilling fluids are filtered by a "shale shaker" or the like and may be permitted to stand in a mudpit for a time, to remove as much of the rock particles or cuttings as possible. Then the fluids are pumped back down the drill pipe 14 in a substantially continuous circulation process. Although various filtering and settling techniques may be employed to remove as much of the rock particles as possible, those skilled in the art will recognize that total removal of all such particles is not possible as a practical matter, and that some entrained solids will remain present in the mud stream.

Turning now to FIGS. 2A-2D for an illustration of the structural details of the present invention, a tubular housing 20 is fixed at its upper end to the drill string by threads 21 and has a central passage 22 for the flow of drilling fluids. Although various types of motor structures may be employed, as previously mentioned, one suitable prime mover arrangement includes stator blades 23 that are fixed within the housing 20, and companion rotor blades 24 that are mounted on a shaft 25 which is journaled within the housing for rotation about its longitudinal axis. Inasmuch as a turbine-type motor is inherently a relatively high rpm device, and since the bit 11 must be turned at a much lower rpm in order to prevent damage thereto, a speed reduction gear box 27 may be employed. The gear box 27 is of a known construction using a planetary gear arrangement much like that shown in Whittle U.S. Pat. No. 2,937,008 and is commercially available. Thus the details thereof need not be further elaborated herein. The output shaft 28 of the gear box 27 is coupled by splines 29 or the like to the output shaft 30 of the drilling motor 13. The shaft 30 may be formed in several sections and extends from the lower end of the housing 20 where a threaded box 31 serves to attach the shaft of the drill bit 11. After exit from the turbine, the mud stream passes through ports 32 (FIG. 2B) and into an annular interior area 33 between the housing 20 and the shaft 28 and then through ports 34 into the hollow interior bore 35 of the output shaft 30. Various bearing assemblies such as thrust bearings 37, 38 and radial bearings 39–41 stabilize the rotating shafts within the housing 20 and carry the axial and radial loads that are imposed during operation of the motor 13.

Figure 2D:
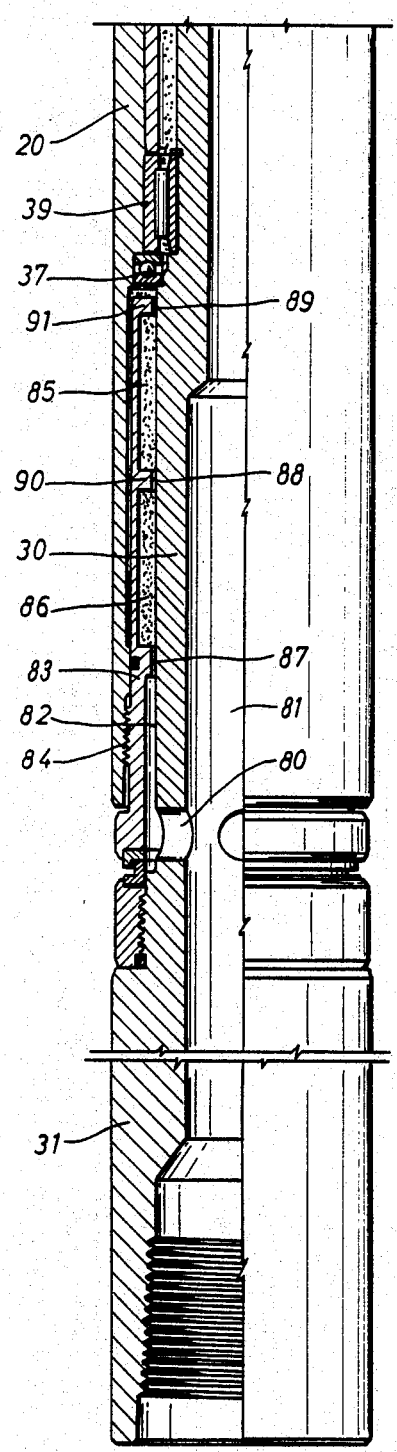
Figure 2A:
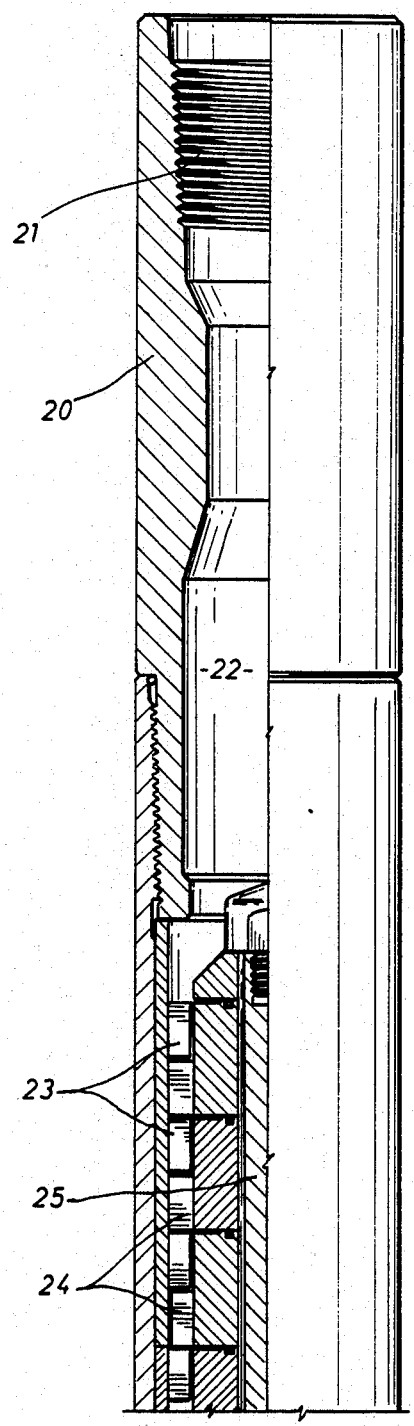
Figure 2B:
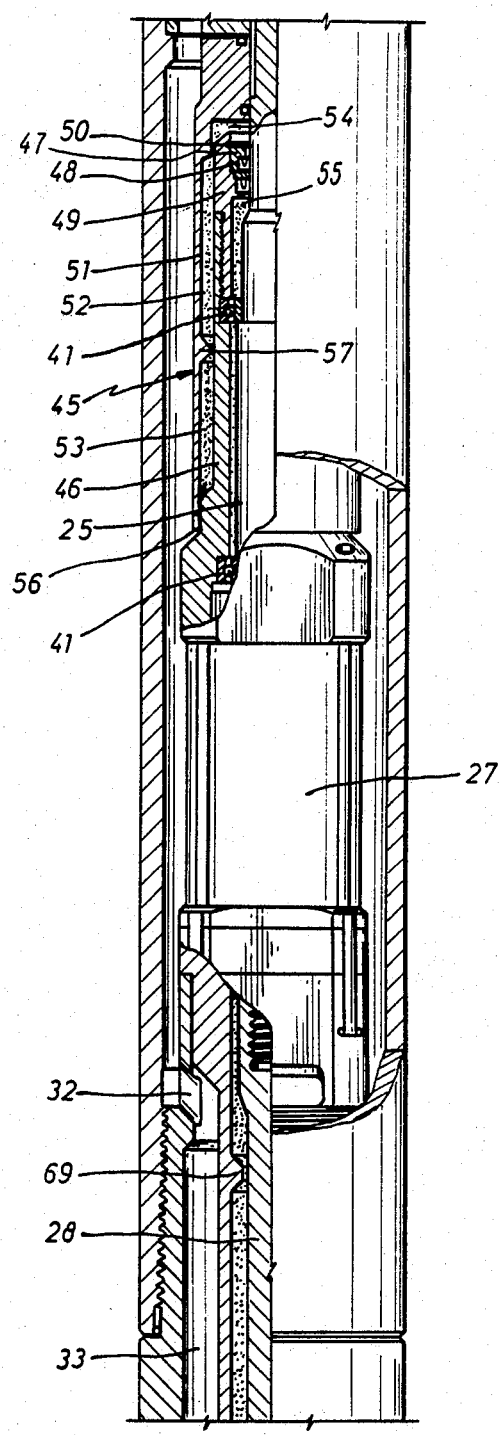

A first lubricated seal system in accordance with the present invention is indicated generally at 45 in FIG. 2B. A tubular member 46 which is mounted on the upper end of the gear box 27 and within which the turbine shaft 25 rotates has a seal assembly 47 mounted on its upper end. The seal assembly 47 includes elastomer packing rings 48 of a suitable construction that are fixed within a retainer cap 49 and which sealingly engage an underlying seal surface 50 of the shaft 25. The rotor assembly is provided with a depending trap sleeve 51 that surrounds the member 46 and extends downwardly therealong. The trap sleeve 51 is provided with upper and lower internal annular recesses 52 and 53, and these recesses as well as the regions 54, 55 immediately above and below the seal 48 are packed by a suitable lubricant such as a relatively heavy grease. An annular clearance space 56 is provided between the lower end of the sleeve 51 and the adjacent section of the member 46 for the communication of drilling mud pressure to the lubricant. As the sleeve 51 rotates with the turbine rotor, any drilling fluid entering the lower cavity 53 is caused to rotate to some extent therewith due to friction forces between the fluid and the rotation member, and such rotation causes any solid particles contained in the fluid to be forced centrifugally to the outside of the cavity 53. An inwardly directed flange 57 on the sleeve blocks upward movement of the solid particles and prevents them from entering the upper recess 52 which also contains lubricant. In a similar manner, tubular member 58, an extension of tubular member 46, has an inwardly directed flange 69 which defines annular recesses between the tubular member 58 and the grear box output shaft 28. The annular recess 59 is similarly filled with a suitable grease as are the communicating recesses above flange 69 in which radial bearings 41 are located between the tubular member 46 and the turbine shaft 25 and terminating in the area 55 immediately below the seal assembly 47. Drilling fluid pressure in the annular area 33 is exerted on the bottom side of a wiper seal 87a, an alternative embodiment of the annular clearance space, which intentionally allows the drilling fluid to leak by it and into the recess 59 as the grease is used up but which prevents loss of the grease therein when no drilling fluid pressure exists. Drilling fluid allowed to enter recess 59 is subjected to centrifugal forces caused by rotation of shaft 28 which likewise cause any solid particles to be forced to the outside of the recess 59 and, if they reach flange 69, are trapped therein. The seal assembly 47 is thus subjected to substantially identical pressure on both sides thereof providing a zero pressure drop across it. Thus the seal assembly 45 is maintained in an optimum environment for long seal life.

Another rotating shaft system that embodies the principles of the present invention is shown in FIG. 2C. Here the seal assembly, indicated generally at 60, includes a retainer ring 61 that rests on a housing, shoulder 62 and is biased thereagainst by a spring 63 such as a Belleville (or spring) washer or the like. The ring 61 carries seals 64 that engage an outer seal surface 65 of the motor output shaft 30 to prevent fluid leakage. A trap sleeve assembly includes an inner sleeve member 66 that is mounted to the housing 20 by a spring washer 67 or the like, and an outer sleeve member 68 that is carried by the output shaft 30 and thus rotates therewith. Upper and lower chambers 70, 71 that are formed in the sleeve member 68 are packed with grease, as is the region 72 above the upper end of the sleeve member 68, the annular area 73 between the sleeve member and the inner wall of the housing, and the region 74 above the seal assembly 64. Annular clearance spaces 75–77 are provided between the sleeve members 66 and 68 for the transmission of drilling mud pressure. As the grease is used up during operation of the motor 13, any drilling mud entering through the lower clearance space 77 into the chamber 71 is forced into rotation therein due to the fluid friction. Thus the solid particles are forced to the outside of the chamber 71 and are blocked by the inwardly directed flange 78 on the sleeve member 68 against movement toward the seals 64. A separation is maintained between the drilling fluids and the grease due to the difference in the density (the grease is lighter and thus floats on the drilling mud) so that the seal assembly 64 is maintained in an optimum environment.

The seal assembly 64 has the pressure of the drilling fluids as the motor 13 is operated imposed upon its upper side. In accordance with another feature of the present invention, such pressure also is imposed on the lower side thereof by one or more radial ports 80 that extend through the wall of the output shaft 30 as shown in FIG. 2D to communicate the bore 81 of the shaft with the annular region 82 between the outside of the shaft and the inner walls of the housing 20. In this manner, the pressures on opposite sides of the seal assembly 64 are substantially equalized to inhibit movement of debris-laden drilling mud toward the seal from either direction. A trap sleeve 83 that is fixed by threads 84 to the housing 20 has upper and lower grease pack chambers 85 and 86, with clearance spaces 87, 88, 89 and inwardly directed shoulders 90, 91 provided as described above with respect to the other embodiments of the present invention. Any drilling mud entering the clearance spaces as the lubricant is dissipated during motor operation is forced into rotation with the shaft 30, and the entrained rock particles are centrifugally separated and forced to the outside of the chamber 86 where they are blocked against upward movement by the flange 90.

In accordance with yet another feature of the present invention, it may be desirable to provide for a slight and controlled leakage to the annulus of any drilling fluid entering the pressure equalization ports 80. As shown in FIG. 2D, and in enlarged detail in FIG. 3, face plates 90 and 91 made of hard metal material such as tungsten carbide are located between and attached with solder or the like to an upper end surface 92 on the shaft sub 31 and a lower end face 93 of the housing 20. Since the plates 90, 91 are not sealed with respect to one another by a seal ring or the like, a slight or nominal leakage path is present that allows rotating pressure containment so that the horsepower of the drilling motor 13 is not substantially reduced, while effecting pressure equalization across the seal assembly 64.

OPERATION

In operation, the parts are assembled as shown in the drawings and grease is injected into the various chambers and motor 13 having the drill bit 11 attached to its output shaft 31 is coupled to the lower end of the drill pipe 14 and lowered into the well 10. When the bit 11 reaches the bottom of the borehole, circulation of drilling mud is initiated which causes the turbine shaft 25 to begin to spin and to rotate the output shaft 30, 31 and the bit via the reduction gear box 27. As the grease that lubricates the seals is used up during operation of the motor 13, any solid particles in the drilling mud stream entering the grease pack chambers are separated centrifugally and are blocked from reaching the shaft seals. Thus the seals are operated in a lubricated environment free of the particulate matter that has heretofore made seal failure a significant and longstanding problem in this art.

The lubricated shaft seal and bearing systems disclosed herein may be used in downhole drilling motors of most any type, and are not limited to use in combination with a turbine-type prime mover. The systems also are not limited in use to a downhole drilling motor, but may have general utility in any downhole tool or other apparatus where the maintenance of an effective rotating shaft seal or bearing has in the past been a problem.

Since certain changes or modifications may be made in the disclosed embodiments without departing from the inventive concepts involved, it is the aim of the appended claims to cover all such changes and modifications falling within the true spirit and scope of the present invention.

What is claimed is:

1. Apparatus adapted for use in a conventional downhole drilling environment wherein a drill string in a borehole includes a drilling motor which drives a drill bit on the end of the drill string by means of power provided by the circulation of drilling fluid pumped from the earth's surface down through the drill string and motor, through the nozzles or jets in the drill bit, then back up to the surface through the annular space between the borehole wall and the drill string, comprising: first and second members that are rotatable relative to one another; structural means between said members adapted to operate in a lubricated environment; chamber means containing a lubricant for lubricating said structural means; means for subjecting said lubricant to the direct pressure of fluids in the drill string, said pressure being exterted in an upward direction against the force of gravity; and centrifugal separator means operable in response to rotation of one of said members for separating and trapping solid particles contained in said fluids to thereby substantially prevent contamination of said lubricant by such solid particles, said centrifugal separator means being located downstream of said subjecting means.

2. The apparatus of claim 1 wherein said structural means comprises seal means for preventing fluid leakage.

3. The apparatus of claim 1 wherein said structural means comprises bearing means for mounting said members for relative rotation.

4. The apparatus of claim 1 wherein said separator means is formed by a sleeve that is mounted on one of said members, said sleeve having wall surfaces defining an annular recess and an inwardly directed shoulder at the upper end of said recess.

5. The apparatus of claim 4 wherein said subjecting means includes passage means extending past said shoulder.

6. Apparatus adapted for use in a conventional downhole drilling environment wherein a drill string in a borehole includes a drilling motor which drives a drill bit on the end of the drill string by means of power provided by the circulation of drilling fluid pumped from the earth's surface down through the drill string and motor, through the nozzles or jets in the drill bit, then back up to the surface through the annular space between the borehole wall and the drill string, comprising: a first member rotatable relative to a second member; structural means between said members adapted to operate in a lubricated environment; a sleeve member mounted on said first member, said sleeve member defining in part a chamber means containing a lubricant for lubricating said structural means; means for subjecting said lubricant to the direct pressure of fluids in the drill string, said pressure being exerted in an upward direction against the force of gravity; and centrifugal separator means operable in response to rotation of said first member and said sleeve member for separating and trapping solid particles contained in said fluids to thereby substantially prevent contamination of said lubricant by such solid particles, said centrifugal separator means being located downstream of said subjecting means.

7. The apparatus of claim 6 wherein said separator means is formed by recess means in said sleeve member located below said chamber means, said sleeve member having an inwardly directed shoulder at the upper end of said recess means.

8. The apparatus of claim 7 wherein said subjecting means comprises passage means extending past said shoulder means.

9. The apparatus of claim 8 wherein said sleeve member surrounds said second member.

10. The apparatus of claim 8 wherein said first member and said sleeve member are mounted inside said second member.

11. Apparatus adapted for use in a conventional downhole drilling environment wherein a drill string in a borehole includes a drilling motor which drives a drill bit on the end of the drill string by means of power provided by the circulation of drilling fluid pumped from the earth's surface down through the drill string and motor, through the nozzles or jets in the drill bit, then back up to the surface through the annular space between the borehole wall and the drill string, comprising: a first member rotatable relative to a second member; structural means between said members adapted to operate in a lubricated environment; a sleeve member mounted on said second member, said sleeve member defining in part a chamber means adapted to contain a lubricant for lubricating said structural means; means for subjecting said lubricant to the direct pressure of fluids in the drill string said pressure being exerted in an upward direction against the force of gravity; and centrifugal separator means on said sleeve member and operable in response to rotation of said first member and said sleeve for trapping solid particles contained in said fluids to bhereby substantially prevent contamination of said lubricant by said solid particles, said centrifugal separator means being located downstream of said subjecting means.

12. The apparatus of claim 11 wherein said separator means is formed by annular recess means and an inwardly directed shoulder at the upper end of said recess means.

13. The apparatus of claim 12 wherein said subjecting means comprises an annular clearance space between said shoulder and said first member.

14. In a downhole drilling motor apparatus having relatively rotatable tubular members, one of which is fixed to the drill pipe and the other of which is fixed to a drill bit, the improvement comprising: structural means between said members adapted to operate in a lubricated environment; chamber means for containing a grease or the like to lubricate said structural means; means for enabling well drilling fluids passing through said members to pressurize said chamber means by exerting pressure directly to said lubricant and in an upward direction against the force of gravity; and centrifugal separator means responsive to relative rotation of said members for separating and trapping solid particles suspended in the drilling fluids to thereby substantially prevent contamination of the lubricant by such solid particles, said centrifugal separator means being located downstream of said pressurization means.

15. The apparatus of claim 14 wherein said structural means comprises seal means for preventing fluid leakage.

16. The apparatus of claim 14 wherein said structural means comprises bearing means for mounting said members for relative rotation.

17. The apparatus of claim 15 further including means for substantially equalizing the pressures of fluids on opposite sides of said seal means.

18. The apparatus of claim 17 wherein said equalizing means comprises port means extending through the wall of said other member and communicating with a region between said members located below said separator means.

19. The apparatus of claim 18 further including passage means adjacent the lower end of said region for enabling leakage of a nominal amount of well fluids to the annulus.

20. The apparatus of claim 19 wherein said passage means extends between coengageable wear plates mounted on said members, said wear plates being made of an erosion resistant material.

* * * * *